United States Patent Office 3,404,791
Patented Oct. 8, 1968

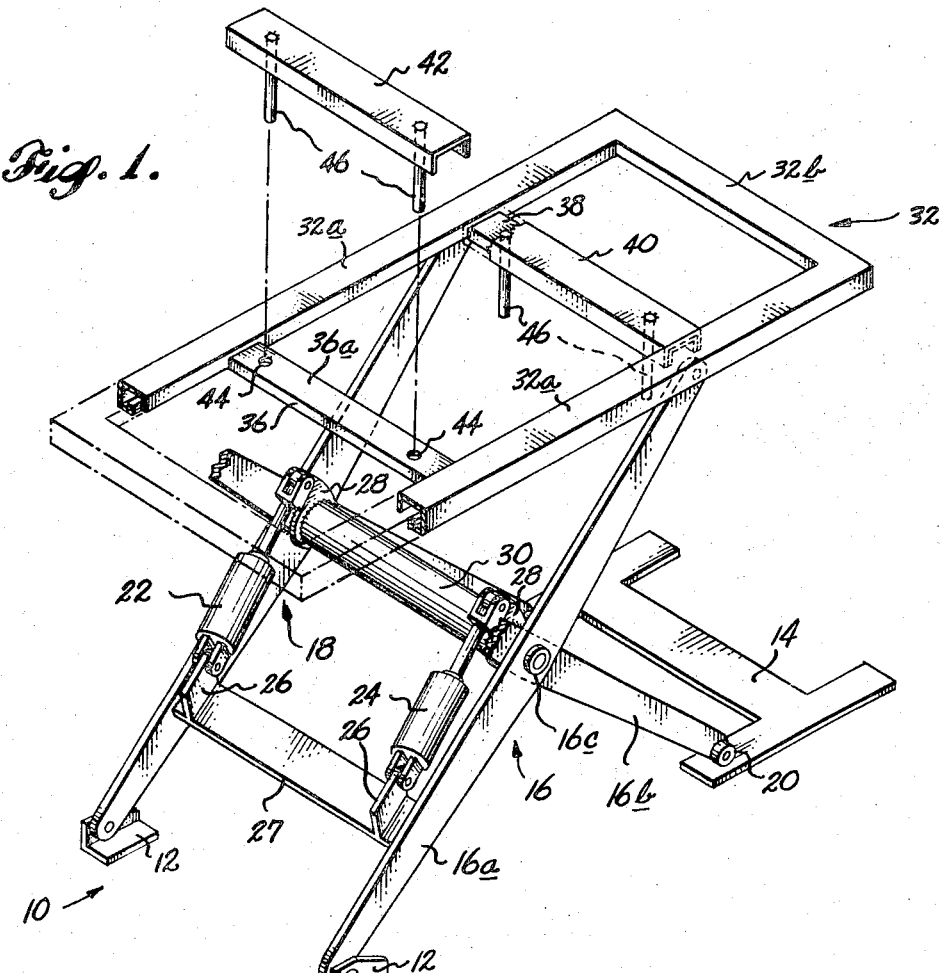
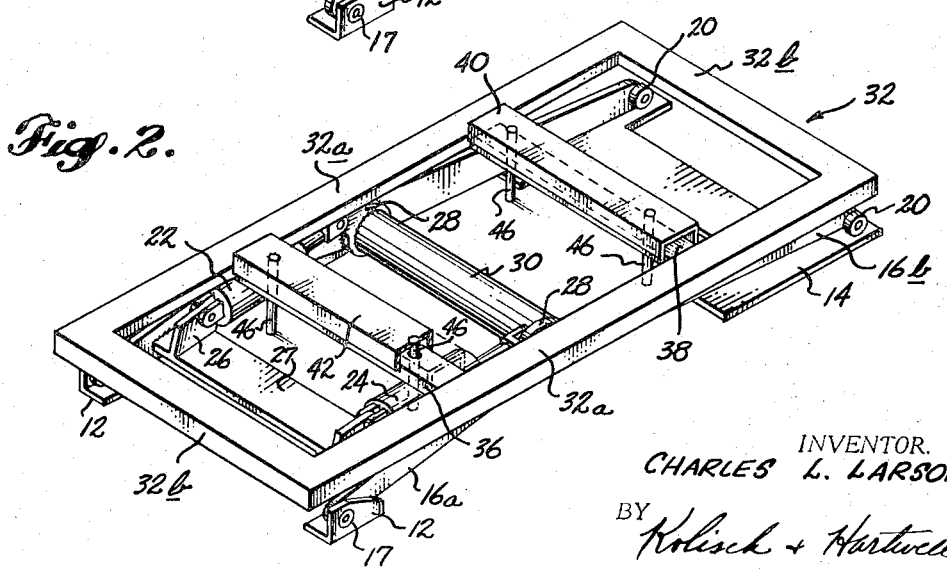

3,404,791
LOAD-SUPPORTING APPARATUS
Charles Le Roy Larson, Grants Pass, Oreg., assignor to Jeddeloh Bros. Sweed Mills, Inc., Gold Hill, Oreg., a corporation of Oregon
Filed Oct. 18, 1965, Ser. No. 497,115
5 Claims. (Cl. 214—38)

ABSTRACT OF THE DISCLOSURE

Load-supporting apparatus including an elevatable platform and a movable support mounted on the platform which has its downward movement arrested upon lowering of the platform to a predetermined position relative to the ground.

---

This invention relates to load-supporting apparatus, and more particularly to apparatus for supporting a load including an elevatable framework on which the load is supported and means for shifting the load upwardly relative to said elevatable framework.

A common piece of equipment in industrial establishments comprises a platform for supporting a load and power-operated means for moving this platform up and down. Such a unit might be used, for instance, in supporting a stack of sheets as sheets from the stack are removed one at a time for further processing. In loading the platform with a new stack of sheets (and similar problems occur when unloading a platform), it is common to use material-handling apparatus such as a fork-lift truck with laterally spaced forks that hold a load prior to and during the actual deposition of it on the platform. Pallets may be employed upon which the load rests to support the load a short space above the ground, which spacing enables the forks of the truck to be moved in and out from under the load. However, pallets require maintenance, and further, when a pallet is included on a platform and left there together with a newly deposited load, it increases the overall height taken up by the load. Thus, it is advantageous in many instances to provide a construction in the platform which enables the deposit of a load on the platform (or the picking up of a load from a platform) without the inclusion of a pallet or other temporary spacer on top of the platform to provide clearance for the lifting forks of a vehicle.

A general object of this invention is to provide load-supporting structure including an elevatable framework having novel load-support means mounted on the framework which may be shifted upwardly relative to the framework to produce a clearance for load-lifting forks and the like, and which are returnable to their original position to provide maximum stability for any load carried over the load-support means.

Another object is to provide in combination with an elevatable framework and support means upwardly shiftable relative to this framework, novel means whereby this upward shifting of the support means relative to this framework takes place automatically upon the framework reaching a predetermined position relative to the ground.

Yet another object of the invention is to provide, in load-supporting apparatus, the combination of a platform providing stable support for a load and load-support means shiftable upwardly from the plane defined by the top of the platform to produce clearance between the base of a load and the top of the platform.

In a specific and preferred embodiment of the invention contemplated herein, the platform may be part of a conventional scissor-lift mechanism and includes the usual frame members defining a load-supporting plane in the platform. Multiple load-supporting bunks, laterally spaced apart from each other, are mounted on the platform, with these bunks resting on rails and so positioned that the tops of the bunks occupy the load-supporting plane defined by the platform with the platform raised from the ground. Legs joined to the bunks and extending downwardly therefrom through apertures provided in the rails engage a surface, such as a bottom plate in the apparatus, or the deck supporting the apparatus, to form a rest for the legs and the bunks to which the legs are joined upon lowering of the platform to a predetermined position relative to the ground. On further lowering of the platform the bunks (which are stationary) move upwardly relative to the platform (which is moving downwardly) to produce a spacing between the bottom of the load (formerly carried by the entire platform but now carried solely by the bunks) and the top of the platform. This spacing may be utilized to accommodate the insertion of forks under the load preparatory to removing the load from the platform (and conversely, when loading the platform with a new load, for removing the forks after having deposited a new load on the bunks).

These and other objects and advantages are attained by the invention, and the same is described hereinbelow in conjunction with the accompanying drawings, wherein:

FIG. 1 is a perspective view showing a hoist with bunks as contemplated herein, showing the hoist raised and with portions broken away, and showing one bunk removed from the hoist and raised; and FIG. 2 is a perspective view showing the hoist lowered, with one of the bunks partially broken away.

Referring now to the drawings, load-supporting or hoist apparatus constructed according to one embodiment of the invention comprises a base 10 including brackets 12 and plate 14 which may be anchored in a suitable manner to a deck or floor. Supported over the top of this base are a pair of opposed scissor mechanisms, designated generally at 16 and 18. Each includes a scissor arm such as those shown at 16a and 16b for scissor mechanism 16, and these arms are pivotally interconnected intermediate their ends, as at 16c for scissor mechanism 16.

The outer scissor arm of each scissor mechanism, exemplified by arm 16a of mechanism 16, is journaled adjacent its lower end on a bracket, as at 17. The inner arm of each scissor mechanism, exemplified by arm 16b, is provided with a roller means 20 at its lower end, which roller means rolls on plate 14.

The arms are pivoted relative to each other by operation of a pair of rams 22, 24. Each has its cylinder end journaled to a bracket 26 which bracket is mounted on a bar 27 extending between the outer scissor arms in the two scissor mechanisms. The rod ends of the rams are journaled on the ends of torque arms 28 which torque arms are joined to a torque tube 30 joined to and extending between the inner scissor arms of the two mechanisms.

Carried on the upper ends of the scissor arms of the two scissor mechanisms is an elevatable framework, more specifically a rectangular platform designated at 32. The platform includes longitudinal frame members 32a, and interconnecting transverse frame members 32b. The scissor mechanisms and rams comprise power-operated elevator mechanism under the platform operable on actuation to raise and lower the platform.

A hoist mechanism similar to the one just outlined is described in a copending application of Charles L. Larson entitled, "Scissor-Lift Mechanism," having Ser. No. 333,454 filed Oct. 26, 1963, now Patent No. 3,246,876. Reference may be made to that application for further details of the hoist mechanism in general if such is necessary. The hoist mechanism described is of type that might be employed in a plywood plant, for instance, in holding a stack of sheets or panels while such sheets are being fed off from the top of the stack. The hoist alternatively could be utilized in collecting sheets in a stack as they travel from a conveyor. In either instance, a fork-lift truck might be employed to deposit or remove a stack from the top of platform 32.

Considering now details of the structure of this invention, platform 32 further comprises a pair of bars 36, 38 extending between longitudinal frame members 32a of the platform. The bars are fixed at their ends to the inner sides of the longitudinal frame members. The bars have top surfaces, such as the one shown at 36a for bar 36, which are somewhat below the support plane defined by the platform, which is the plane defined by the top of frame members 32a. The bars are laterally spaced from each other, and inside the region bounded by longitudinal frame members 32a and transverse frame frame members 32b.

Disposed over and resting on these bars are a pair of channel irons shown at 40, 42. These channel irons, which also are referred to herein as bunks, or support means for suporting a load, when resting on the bars as shown in FIG. 1 have top surfaces that are in the plane defined by the top of plaftorm 32. The flanges along the sides of the channel irons extend downwardly over the sides of bars 36, 38. Thus, the channel irons are mounted in a stable position and held from tipping over, skewing, etc. With the hoist mechanism actuated to raise platform 32, and with the channel irons sitting on the tops of bars 36, 38, the channel irons supplement the frame members of the platform in supporting the base of a load.

Bars 36, 38 are provided with bores extending downwardly therethrough, one adjacent each end of the bar, and these bores are indicated at 44. The bores, which constitute guide means in the construction, slidably receive legs or pins 46 which have their upper ends joined to the undersides of the channel irons resting on top of the bores. With the platform raised in the hoist, the bottom ends of the legs are held suspended in the air. On lowering of the platform in the hoist, when the platform reaches adjacent the floor, the bottom ends of the arms engage the top of the floor and prevent further downward movement of the pins and channel irons to which the pins are attached. Thus, on such bottom ends of the pins contacting the floor and on further downward movement of the platform, the channel irons are caused to shift upwardly relative to the top of platform 32, to provide a space between the bottom of any load supported on the channel irons and the top of platform 32. This space increases as the platform is lowered, and with the platform fully lowered the space is sufficient to enable the forks of a fork-lift truck to be slipped under a load for purposes of lifting it off. Conversely, the space enables a load to be deposited on the channel irons with there then being room to slip the forks out from underneath the load.

Thus, it will be seen that a hoist or load-supporting apparatus is contemplated operable automatically on lowering of the platform in the apparatus and on the platform reaching a predetermined position, to produce a space between any load carried on the platform and the platform, through relative upward movement of the support means or channel irons described. The construction results in full stability in any load with the platform raised, since the load at this time is supported adjacent its ends and sides and also by the channel irons. Further, with the platform raised the overall height of the load plus platform is maintained at a minimum. With lowering of the platform, however, where stability and clearance problems are not so important, a space results which enables easy unloading and loading. The hoist permits loads to be handled without including a pallet or other handling devices.

While an embodiment of the invention has been described, it should be obvious that variations and modifications are possible without departing from the invention. It is desired to cover all modifications of the invention as would be apparent to one skilled in the art, and that come within the scope of the appended claims.

It is claimed and desired to secure by Letter Patent:

1. Load-supporting apparatus comprising
an elevatable platform,
at least a pair of elongated laterally spaced-apart load-supporting bunks,
said platform including a pair of laterally spaced-apart rails and said bunks, with said platform in an elevated position, resting on said rails,
a leg extending downwardly from each of said bunks,
guide means on the platform slidably receiving said legs, and
a surface operable to engage the legs upon lowering of the platform and bunks and upon such engagement to inhibit downward of the bunks so that on further downward movement of the platform the platform moves downwardly relative to the bunks to leave the bunks higher than the platform with the tops of the bunks defining a plane elevated above the platform,
an opening being defined between the bunks extending from the plane defined by the tops of the bunks downwardly to accommodate the movement of a lifting element through such plane.

2. The load-supporting apparatus of claim 1, wherein said platform includes frame members defined a load-supporting plane for the platform, and said bunks when resting on said rails in said platform are supported with the tops of the bunks in the load-supporting plane of the platform.

3. The load-supporting apparatus of claim 2, wherein said bunks are recessed along the bottom thereof and the recesses in the bunks received said rails with the tops of the bunks in the load-supporting plane defined by the platform.

4. The apparatus of claim 3, wherein said guide means comprises an aperture in the rail having a leg extending therethrough.

5. Load-supporting apparatus comprising
a platform defining a load-supporting plane,
a pair of laterally spaced-apart elongated supports, means mounting said supports on said platform comprising a downwardly extending leg for each support and guide means in the platform receiving the leg,
a surface under such legs supporting the legs in a raised position relative to the platform and with the tops of said supports defining a plane disposed above said load-supporting plane defined by said platform,
an opening being defined between the supports extending from the plane defined by the tops of the supports downwardly toward the load-supporting plane defined by said platform, and
power-operated elevator mechanism disposed under the platform adapted on actuation to raise the platform,
said legs on raising of the platform being lifted free of said surface and dropping to a lowered position relative to said platform to permit the tops of the supports to move into the load-supporting plane defined by said platform.

References Cited

UNITED STATES PATENTS

| | | | |
|---|---|---|---|
| 2,639,050 | 5/1953 | Hoffmann | 214—38 X |
| 3,151,754 | 10/1964 | Kemp | 214—38 X |
| 2,944,685 | 7/1960 | Nicolazzi | 214—713 XR |

ROBERT G. SHERIDAN, *Primary Examiner.*